United States Patent [19]

Shirasaka

[11] Patent Number: 4,918,605

[45] Date of Patent: Apr. 17, 1990

[54] METHOD AND SYSTEM FOR DETECTING AND PROCESSING ULTRASONIC DOPPLER SIGNALS

[75] Inventor: Toshio Shirasaka, Tochigi, Japan

[73] Assignee: Kabushiki Kaisha Toshiba, Kawasaki, Japan

[21] Appl. No.: 127,469

[22] Filed: Dec. 2, 1987

[30] Foreign Application Priority Data

Dec. 5, 1986 [JP] Japan .................... 61-290960

[51] Int. Cl.$^4$ .................... G06F 15/42; G06G 7/60
[52] U.S. Cl. .................... 364/413.25; 128/660.05; 128/661.09; 73/861.25
[58] Field of Search .................... 128/661.09, 660.05; 364/413.07, 413.25; 73/861.25

[56] References Cited

U.S. PATENT DOCUMENTS

| | | | |
|---|---|---|---|
| 4,223,560 | 9/1980 | Glenh | 364/413.25 X |
| 4,254,662 | 3/1981 | Kuroda et al. | 73/626 |
| 4,416,286 | 11/1983 | Iinuma | 128/660.05 |
| 4,509,525 | 4/1985 | Seo | 128/660.05 |
| 4,622,634 | 11/1986 | Fidel | 364/413.25 |
| 4,622,977 | 11/1986 | Namekawa | 128/661.09 |
| 4,622,978 | 11/1986 | Matsuo | 128/660.05 |
| 4,630,612 | 12/1986 | Uchida | 128/660.05 |
| 4,660,565 | 4/1987 | Shirasaka | 128/661.09 |
| 4,708,127 | 11/1987 | Abdelghani | 128/24 A |
| 4,768,515 | 9/1988 | Namekawa | 128/661.09 |

OTHER PUBLICATIONS

U.S. patent application Ser. No. 146,180, (Shirasaka), filed 1/20/88.

Primary Examiner—Jerry Smith
Assistant Examiner—Steven G. Kibby
Attorney, Agent, or Firm—Finnegan, Henderson, Farabow, Garrett and Dunner

[57] ABSTRACT

The ultrasonic beam is transmitted a plurality of times in the same direction. The echo signals from an object under examination are detected by a plurality of receiving delay circuits. The raster signals used for ultrasonic tomogram contain two directional components for one directional transmitting beam. The directions of these components are different from that of the transmitting beam. A raster signal processing unit for tomogram is made up of a single system, eliminating the sensitivity difference problem, in the system using a plurality of receiving circuits. The Doppler signal for Doppler imaging has a high frequency resolution since transmitting of the ultrasonic beam is repeated in the same direction.

8 Claims, 4 Drawing Sheets

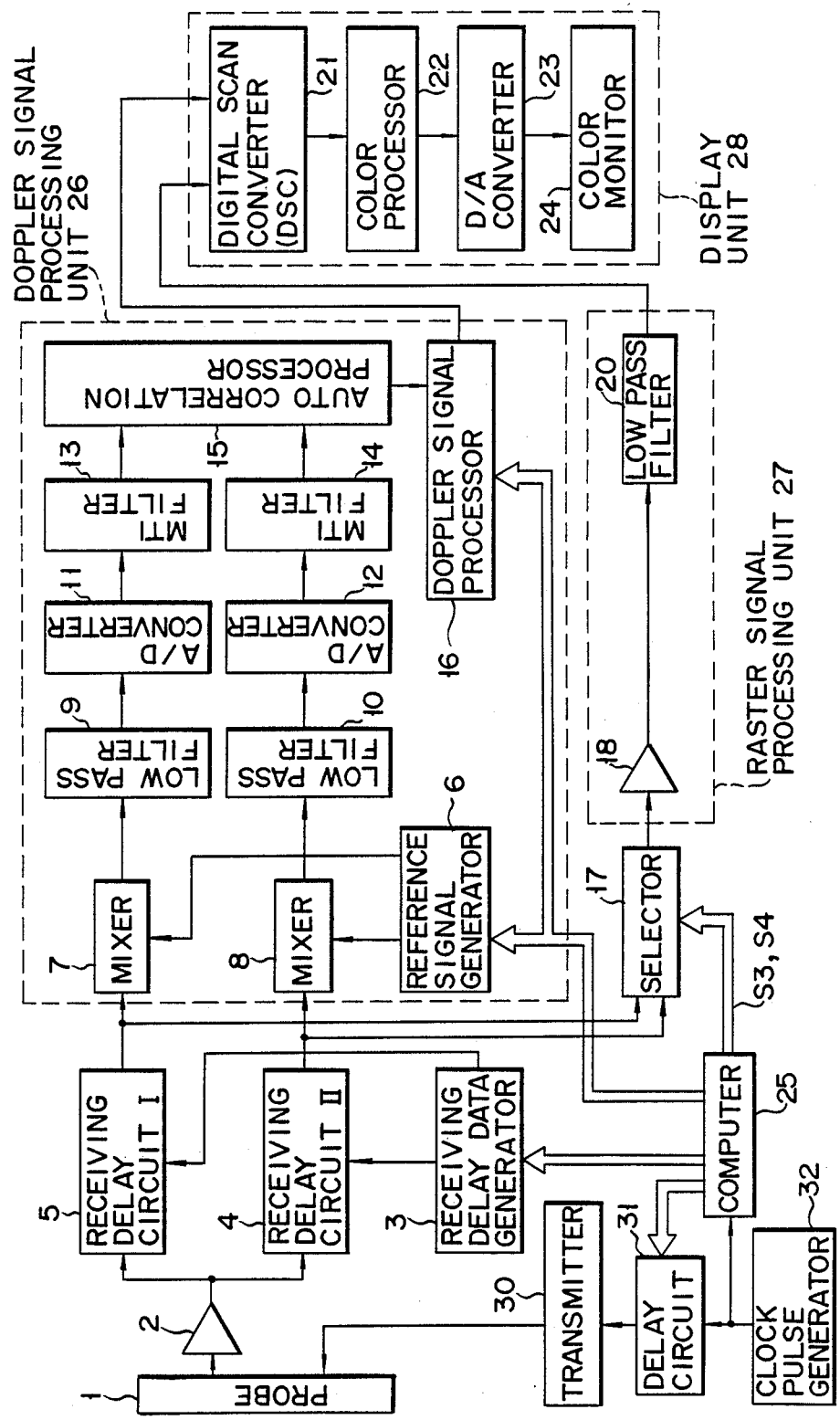
F I G. 1

METHOD AND SYSTEM FOR DETECTING AND PROCESSING ULTRASONIC DOPPLER SIGNALS

BACKGROUND OF THE INVENTION

This invention relates to a method for detecting and processing ultrasonic Doppler signals in order to display a blood flow image and a tomogram by detecting echo signals using a plurality of receiving delay circuits during a period that the ultrasonic beam is repeatedly transmitted in the same direction, and to a system for executing that method.

The recent ultrasonic diagnosis apparatus with ultrasonic probe containing a number of transducers, are capable of displaying a tomogram and a blood flow image as obtained from the two dimensionally detected Doppler signal, in real time, at the same time.

To obtain the Doppler signal, it is necessary to analyze the received echo signal. To improve the frequency resolution of the detected doppler signal, transmitting and receiving of the ultrasonic beam must be repeated in the same direction. The frequency resolution "df" is given by $$df = 1/(Tr \cdot (n-1)) \quad (1)$$

where Tr is the repeating period of the transmitting pulse signal, and "n" is the repeating number. As seen from this equation, as the repeating number "n" is increased, the frequency resolution "df" becomes small, that is, the frequency resolution is improved. When the repeating number "n" is increased, the two dimensional Doppler signal is detected, and this is displayed in real time, the number of frames of the blood flow image and the ultrasonic tomogram are reduced.

To solve this, there is a proposal to arrange the receiving system in parallel. In this proposal, a transmitting beam is received with different delay times, so that two raster signals, for example, are obtained by the transmitting beam in the same direction. This parallel arranged receiving system needs two circuits each comprising a detector for obtaining ultrasonic tomogram, a filter, A/D converter, and the like. Practically, however, it is difficult to match the characteristics of these circuits. Generally, each of these circuits uses a logarithmic circuit of approximately 100 dB at the prestage of the detector, in order to make a gray scale display. To obtain a sensitivity difference within 1 dB in the linear circuit, it must be set within 0.1 dB in the logarithmic circuit. Presence of the sensitivity difference between these two circuit systems would cause the sensitivity of the raster signal to be not uniform, and to decrease an image quality.

For the above reasons, it has been demanded that with the parallel arrangement of the receiving circuit, the blood flow image and the tomogram are displayed by obtaining the Doppler signal and the raster signal at the same time, and a single circuit for processing the raster signal is used for the image quality improvement.

SUMMARY OF THE INVENTION

Accordingly, an object of this invention is to provide a method for detecting and processing ultrasonic Doppler signals in order to display a blood flow image and a tomogram by detecting echo signals using a plurality of receiving delay circuits during a period that the ultrasonic beam is repeatedly transmitted in the same direction, and a system for executing that method.

According to one aspect of this invention, there is provided a method for detecting and processing ultrasonic Doppler signals in order to display an image of fluid flow and a tomogram, comprising the steps of:

receiving a plurality of echo signals as reflected from an object by the ultrasonic beam repeatedly transmitted in the same direction;

delay processing a plurality of received echo signals with different delay times;

detecting the doppler frequency of the echo signals after the delay process;

calculating parameters representing a state of fluid flow inside the object by using the detected doppler frequency;

outputting selectively the echo signals one by one, obtained by delay processing for a plurality of receiving signals;

detecting the raster signals of the object from the output echo signals;

image processing the parameters and the raster signals; and displaying the fluid flow image and the tomogram at the same time by the image processing.

According to another aspect of this invention, there is provided a system for detecting and processing ultrasonic doppler signals in order to display an image of fluid flow and a tomogram, comprising:

means for receiving a plurality of echo signals as reflected from an object by the ultrasonic beam repeatedly transmitted in the same direction;

means for delay processing a plurality of received echo signals with different delay times;

means for detecting the doppler frequency of the echo signals after the delay process;

means for calculating parameters representing a state of fluid flow inside the object by using the detected doppler frequency;

selecting means for outputting selectively the echo signals one by one, obtained by delay processing for a plurality of receiving signals;

means for detecting the raster signals of the object from the output echo signals;

means for image processing the parameters and the raster signals; and means for displaying the fluid flow image and the tomogram at the same time by the image processing.

BRIEF DESCRIPTION OF THE DRAWINGS

FIG. 1 shows a block diagram illustrating an ultrasonic Doppler signal detecting and processing system according to one embodiment of the invention;

DETAILED DESCRIPTION OF THE PREFERRED EMBODIMENT

Figure 2:
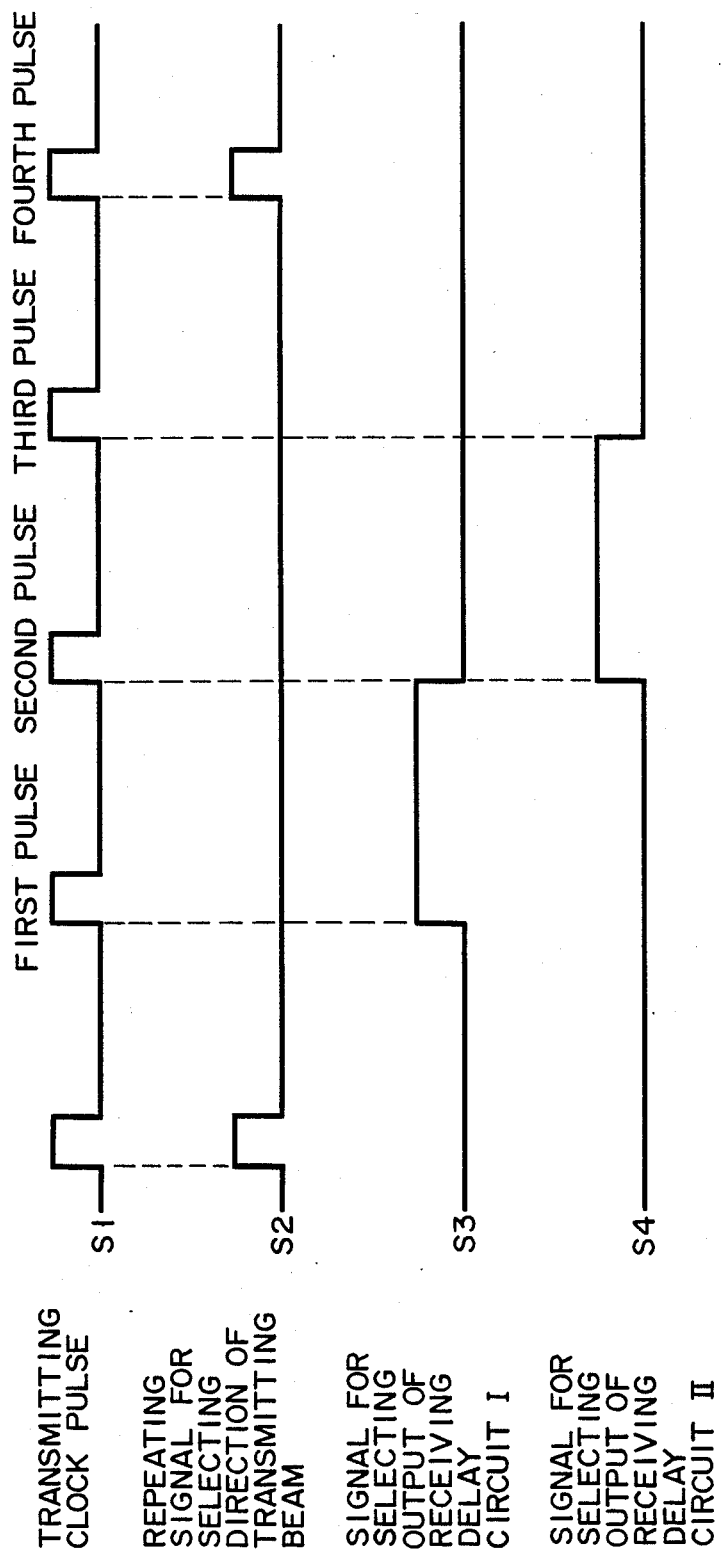
FIG. 2 shows a timing chart illustrating the detection of a Doppler signal and a raster signal.

A preferred embodiment of this invention will be described referring to the accompanying drawings. A number of transducers, which are arrayed in probe 1, are selectively driven by a pulse signal output from clock pulse generator 32, via delay circuit 32 and transmitter 30. The signal output from preamplifier 2 is input to parallel arranged receiving delay circuits 4 and 5. These receiving delay circuits 4 and 5 delay the signal from preamplifier 2 with different delay times. Through the delay processing, the one-direction of the ultrasonic transmitting beam gives raster signals with two directions, which are different from the direction of the transmitting beam. The delay times of receiving delay circuits 4 and 5 are set by receiving delay data generator 3.

The output signals from receiving delay circuits 4 and 5 are input to Doppler signal processing unit 26, and via selector 17 to raster signal processing unit 27. Doppler signal processing unit 26 is comprised of mixers 7 and 8 directly connected to receiving delay circuits 4 and 5, reference signal generator 6, low-pass filters 9 and 10, A/D converters 11 and 12, MTI (moving target indicator) filters 13 and 14, auto-correlation processor 15, and Doppler signal processor 16. In mixers 7 and 8, phase detections are performed according to the signal output from reference signal generator 6. The signals output from mixers 7 and 8 are input to MTI filters 13 and 14, through low-pass filters 9 and 10 and A/D converters 11 and 12. The MTI is a process to detect only the moving target by using the Doppler effect, and has belonged to the radar technology. The MTI process is used for detecting only the Doppler frequency component of blood flow which is the relatively faster of the velocity in blood flow and blood vessel motion, which are contained in the received echo signal. The output signals from MTI filters 13 and 14 are passed to auto-correlation processor 15, and then these signals are input to Doppler signal processor 16. This processor computes the average velocity of blood flow and its variance, the power of the Doppler signal, and the like. These results are colored by display unit 28.

Raster signal processing unit 27 is comprised of logarithmic amplifier 18 and low-pass filter 20 and acquires raster signals to reconstruct an ultrasonic tomogram such as a B-mode image. Selector 17 selects either of the output signals from receiving delay circuits 4 and 5, and inputs the selected output signal to raster signal processing unit 27. Specifically, in this system, selector 17 selects either of one raster signal obtained by one transmitting pulse signal and another raster signal of another transmitting pulse signal, and inputs the selected signal to logarithmic amplifier 18. The timing of this selection is synchronized with the pulse signal output from clock pulse generator 32, and the selection is performed under the control of computer 25. An ultrasonic tomogram as reconstructed by using the raster signals is colored by display unit 28. Computer 25 also controls receiving delay data generator 3, reference signal generator 6, Doppler signal processor 16, and delay circuit 31.

Display unit 28 is comprised of DSC (digital scan converter) 21, color processor 22, D/A converter 23, and color monitor 24. The data output from Doppler signal processing unit 26 and raster signal processing unit 27 are input to DSC 21 for image reconstruction. Color processor 22 colors the parameters as calculated by Doppler signal processor 16, and these parameters are displayed on color monitor 24.

The operation of the Doppler signal detecting and processing system will be described.

Figure 3:
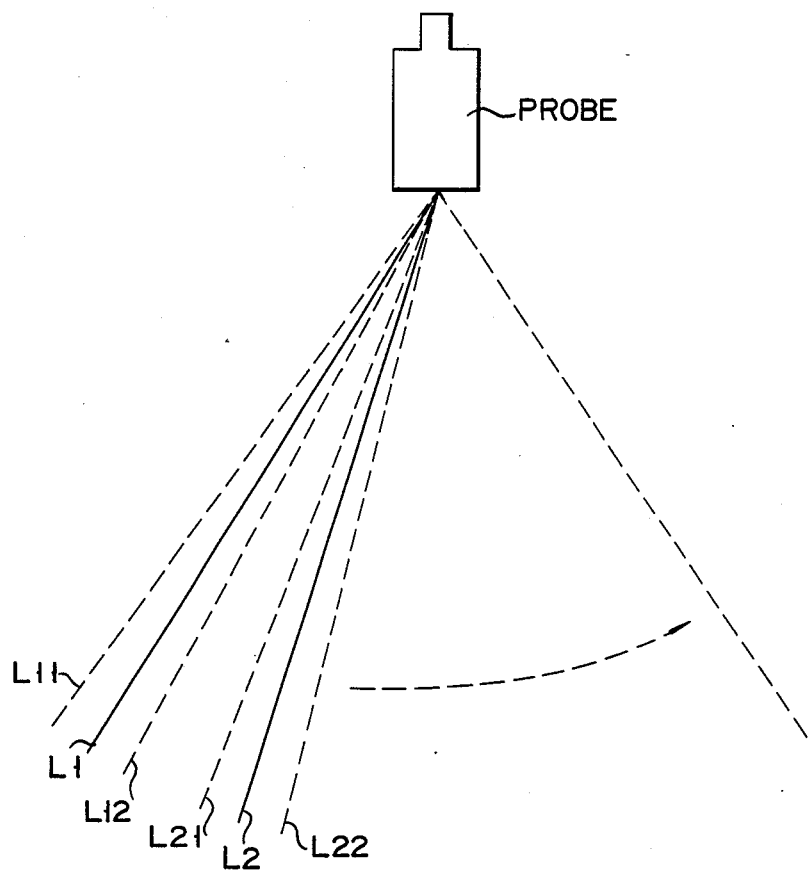
FIG. 3 shows a schematic illustration of an ultrasonic transmitting beam and an ultrasonic beam resulting from composing the transmitting and receiving beams.

In FIG. 2, transmitter 30 selectively drives the transducers in probe 1, and transmits the ultrasonic beam in the L1 direction, as shown in FIG. 3. The echo signal which is caused by the ultrasonic beam transmitted in the L1 direction is received by the transducers in probe 1, and is input through preamplifier 2 to receiving delay circuits 4 and 5. These circuits 4 and 5 execute the receiving focus of the signal received through the receiving delay processing, so that the ultrasonic beam resulting from the transmitting and receiving beam composition is directed in the directions L11 and L12. With repeat of the transmitting beam in the same direction, raster signals with two directions different from that of the transmitting beam are obtained.

In this system, transmitting of the ultrasonic beam is repeated four times. As for the ultrasonic beam of the L1 direction, four transmitting cock pulses S1 shown in FIG. 2 are transmitted in the same direction. The repeating signal S2 for switching the direction of transmitting beam is generated in synchronism with the fourth pulse signal. The ultrasonic beam in the L2 direction is set so that two ultrasonic beams resulting from the transmitting and receiving composition take directions L21 and L22. By repeat of this process the scanning of the region of interest is performed. The signals output from receiving delay circuits 4 and 5 are input to Doppler signal processing unit 26, and through selector 17 to raster signal processing unit 27.

In Doppler signal processing unit 26, the signals output from receiving delay circuits 4 and 5 are parallel processed, to obtain the Doppler signals in the directions L11 and L12, which result from the transmitting and receiving composition.

The Doppler signal processor 16 computes the average velocity of the blood flow and its variance, and the power of the Doppler signal, and the like.

Figure 4:
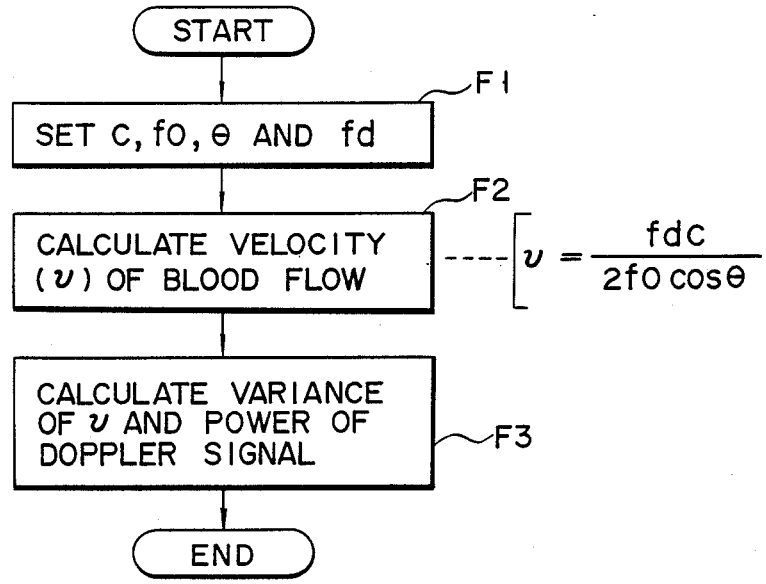
FIG. 4 shows a flowchart illustrating the operation of a Doppler signal processor.
Figure 5:
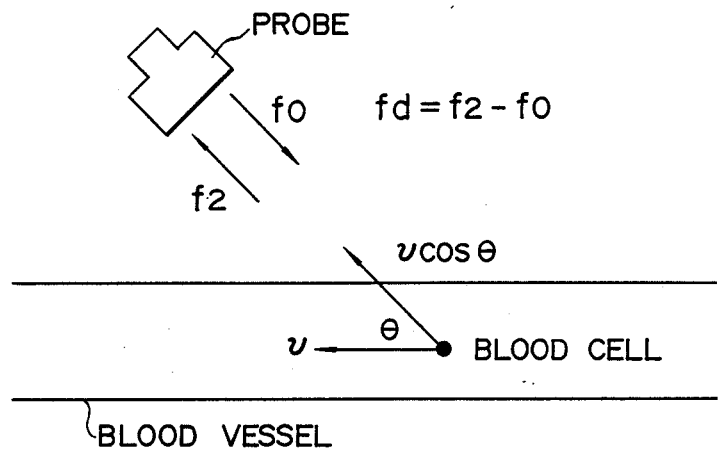
FIG. 5 shows a schematic illustration to explain the principle of measuring a blood velocity using the ultrasonic beam.

FIG. 4 shows a flowchart describing the operation of the Doppler signal processor. In step F1, sound velocity C in the object under examination, transmitting frequency fo of the ultrasonic probe, angle $\theta$ between the ultrasonic beam direction and the blood flow direction (FIG. 5), and the Doppler frequency fd are set. The Doppler frequency fd is expressed by f2−fo, where f2 is the frequency of the echo signal as received by the probe. In step F2, the average velocity of blood flow is calculated by using the parameters as set in step F1.

The blood flow velocity v is given by $$v = fdC/2fo\cos\theta \qquad (2)$$

In step F3, the variance of the blood flow velocity and the power of the Doppler signal are calculated.

The parameters of the blood flow are obtained through the above processings.

In the system, to remove the sensitivity difference due to use of a plurality of raster signal processing circuit systems for obtaining the tomogram, these circuit systems are replaced by a single circuit system by using selector 17. Specifically, the signal S3 output from computer 25 is set in HIGH level during a period from the rising time of the first pulse of the transmitting clock signals S1 to the rising time of the second pulse. During this period, the signal output from receiving delay circuit 4 is selected, thereby to obtain the raster signal in the L11 direction.

Then, during a period from the rising time of the second pulse of transmitting clocks S1 to the rising time of the third pulse, the signal S4 output from computer 25 is set in HIGH level. During this period, the signal output from receiving delay circuit 5 is selected, thereby to obtain the raster signal in the L12 direction.

As described above, through transmitting of the ultrasonic beam in the same direction, the raster signals of two directions, which are different from that of the transmitting beam, can be obtained. By use of a single raster signal processing circuit for obtaining the ultrasonic tomogram, the problem of the sensitivity difference in the use of a plurality of raster signal processing circuits is eliminated, and the decrease of image quality is prevented.

It should be understood that this invention is not limited to the above-mentioned embodiment, but may variously be modified within the scope and the spirit of this invention.

What is claimed is:

1. A method for detecting and processing ultrasonic Doppler signals to display a fluid flow image, comprising the steps of:
    transmitting an ultrasonic beam in a raster direction a predetermined number of times;
    respectively receiving a plurality of echo signals at receivers each having a directivity different from the raster direction, each receiver having a different directivity than that of each other receiver;
    obtaining Doppler data from the respective received echo signals;
    selecting each echo signal as tomogram data from the respective received echo signals;
    acquiring a fluid flow image in accordance with the obtained Doppler data and the tomogram data; and
    displaying the acquired fluid flow image.

2. The method according to claim 1, wherein the Doppler data include a fluid flow velocity, its variance, and the power of the echo signals.

3. The method according to claim 2, wherein the fluid flow velocity v is given by $$v = fdc/2fo\cos\theta$$

where
   c: sound velocity within an object,
   fo: transmitting frequency of ultrasonic probe,
   $\theta$: angle between the direction of the transmitted ultrasonic beam and the direction of fluid flow,
   fd: Doppler frequency obtained by receiving the echo signal.

4. The method according to claim 1, wherein the Doppler data are used for determining the color at each point in a color display.

5. A system for detecting and processing ultrasonic Doppler signals to display a fluid flow image, comprising:
    means for transmitting an ultrasonic beam in a raster direction a predetermined number of times and for respectively receiving a plurality of echo signals having a plurality of directivities different from the raster direction;
    means for obtaining Doppler data from the respective received echo signals;
    selecting means for selecting each echo signal as tomogram data from the respective received echo signals;
    means for acquiring a fluid flow image in accordance with the obtained Doppler data and the tomogram data; and
    means for displaying the acquired flow image.

6. The system according to claim 5, wherein the means for obtaining Doppler data includes means for obtaining the fluid flow velocity v by using the equation below:

$$v = fdc/2fo\cos\theta$$

where
   c: sound velocity within an object,
   fo: transmitting frequency of ultrasonic probe,
   $\theta$: angle between the direction of the transmitted ultrasonic beam and the direction of fluid flow,
   fd: Doppler frequency obtained by receiving the echo signal.

7. The system according to claim 5, wherein the displaying means includes means for color displaying the Doppler data representing a state of a fluid flow.

8. The system according to claim 5, wherein the received echo signals are each selected by the selecting means in accordance with a timing pulse generated by a clock pulse generator.

* * * * *